US012693579B2

(12) United States Patent
Iwamatsu

(10) Patent No.: US 12,693,579 B2
(45) Date of Patent: Jul. 28, 2026

(54) OPTICAL APPARATUS

(71) Applicant: CANON KABUSHIKI KAISHA, Tokyo (JP)

(72) Inventor: Junichiro Iwamatsu, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 351 days.

(21) Appl. No.: 18/594,163

(22) Filed: Mar. 4, 2024

(65) Prior Publication Data

US 2024/0345458 A1 Oct. 17, 2024

(30) Foreign Application Priority Data

Apr. 11, 2023 (JP) ................................. 2023-064031

(51) Int. Cl.
G03B 17/12 (2021.01)
(52) U.S. Cl.
CPC .................................... G03B 17/12 (2013.01)
(58) Field of Classification Search
None
See application file for complete search history.

(56) References Cited

U.S. PATENT DOCUMENTS

2012/0251089 A1* 10/2012 Nagashima ............ G02B 7/102
                                                          396/145
2016/0103331 A1   4/2016 Lee
2016/0241787 A1   8/2016 Sekimoto 2021/0247663 A1*  8/2021 Lee .......................... G02B 7/09
2022/0066290 A1*  3/2022 Kim ........................ G03B 13/36
2023/0010659 A1*  1/2023 Lee ........................ G03B 17/12

FOREIGN PATENT DOCUMENTS

JP        2012-215828 A    11/2012
KR       20190134017 A     12/2019
WO         2014003281 A1    1/2014

OTHER PUBLICATIONS

A European Search Report issued on Sep. 12, 2024, that issued in the corresponding European Patent Application No. 24162915.3.

* cited by examiner

*Primary Examiner* — Shan Liu
(74) *Attorney, Agent, or Firm* — Cowan, Liebowitz & Latman, P.C.

(57) ABSTRACT

An optical apparatus includes a lens barrel, holding members sandwiching and holding the lens barrel with elastic members therebetween, and the elastic members disposed between the lens barrel and the holding members. The holding members include a first holding member, and a second holding member which is disposed on a side opposite to the first holding member in an optical axis direction with the lens barrel sandwiched therebetween. The elastic members include first elastic members and second elastic members. A plurality of first accommodation portions accommodating the first elastic members are formed in one of the lens barrel and the first holding member. A plurality of second accommodation portions accommodating the second elastic members are formed in one of the lens barrel and the second holding member. The first elastic members and the second elastic members have spherical shapes. The first accommodation portions and the second accommodation portions have recessed shapes capable of accommodating the elastic members.

8 Claims, 9 Drawing Sheets

200

OPTICAL APPARATUS

BACKGROUND OF THE INVENTION

Field of the Invention

The present invention relates to holding of a lens barrel in an optical apparatus.

Description of the Related Art

In the related art, in image capturing devices including a lens barrel, regarding a means for supporting a lens barrel in an image capturing device, a constitution in which the lens barrel is fastened to a main body of the image capturing device using screws is generally adopted. However, if the lens barrel is fastened and fixed using screws, vibration and mechanical noise occurring in the lens barrel are propagated to a microphone included in the main body of the image capturing device through the screws and are collected therein. For this reason, a constitution for curbing direct transmission of an external force in an optical axis direction from the lens barrel to the main body of the equipment and curbing direct transmission of mechanical noise of the lens barrel to a frame is required. For example, Japanese Patent Laid-Open No. 2012-215828 discloses a technique of holding a lens barrel by sandwiching it between a frame and a frame plate with rubber caps therebetween.

However, in the technology in the related art disclosed in Japanese Patent Laid-Open No. 2012-215828, there is a need to insert each of the rubber caps into one of a plurality of attachment portions provided in each of the lens barrel and the frame, which results in a lack of assemblability. Further, if reaction forces of the rubber caps sandwiched between the lens barrel and the frame are significant, the effect of curbing propagation of mechanical noise occurring in the lens barrel to a microphone may be reduced.

SUMMARY OF THE INVENTION

The present invention provides an optical apparatus which can be easily assembled and can reduce propagation of vibration occurring in a lens barrel.

An optical apparatus of the present invention includes a lens barrel, holding members sandwiching and holding the lens barrel with elastic members therebetween, and the elastic members disposed between the lens barrel and the holding members. The holding members include a first holding member, and a second holding member which is disposed on a side opposite to the first holding member in an optical axis direction with the lens barrel sandwiched therebetween. The elastic members include a plurality of first elastic members disposed between the lens barrel and the first holding member, and a plurality of second elastic members disposed between the lens barrel and the second holding member. A plurality of first accommodation portions accommodating the first elastic members are formed in at least one of the lens barrel and the first holding member. A plurality of second accommodation portions accommodating the second elastic members are formed in at least one of the lens barrel and the second holding member. The first elastic members and the second elastic members have spherical shapes. The first accommodation portions and the second accommodation portions have recessed shapes capable of accommodating the elastic members.

Further features of the present invention will become apparent from the following description of exemplary embodiments with reference to the attached drawings.

DESCRIPTION OF THE EMBODIMENTS

Figures 1A, 1B, 1C:
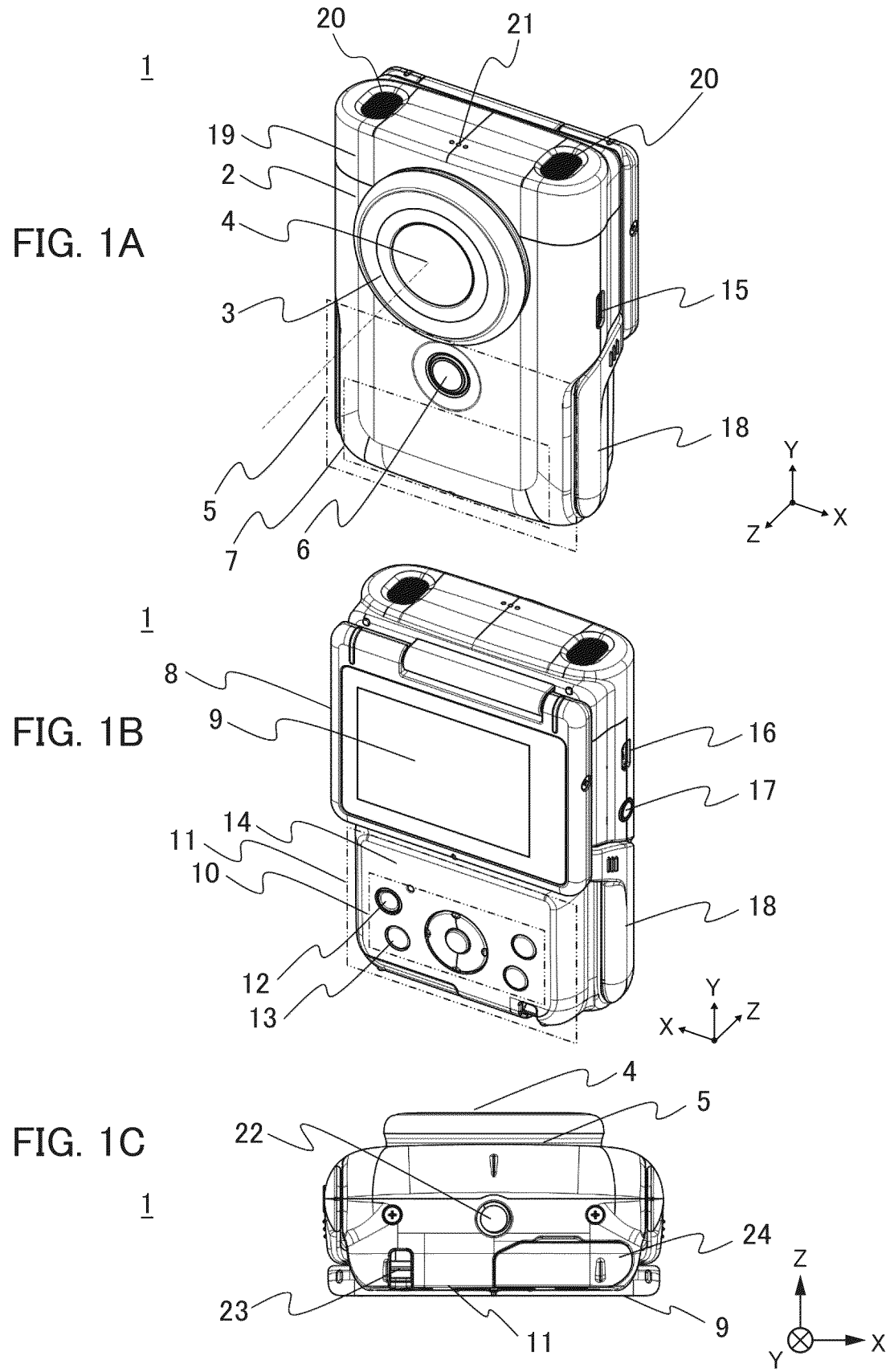
FIGS. 1A to 1C are explanatory views of external appearances of a camera.
Figure 2:
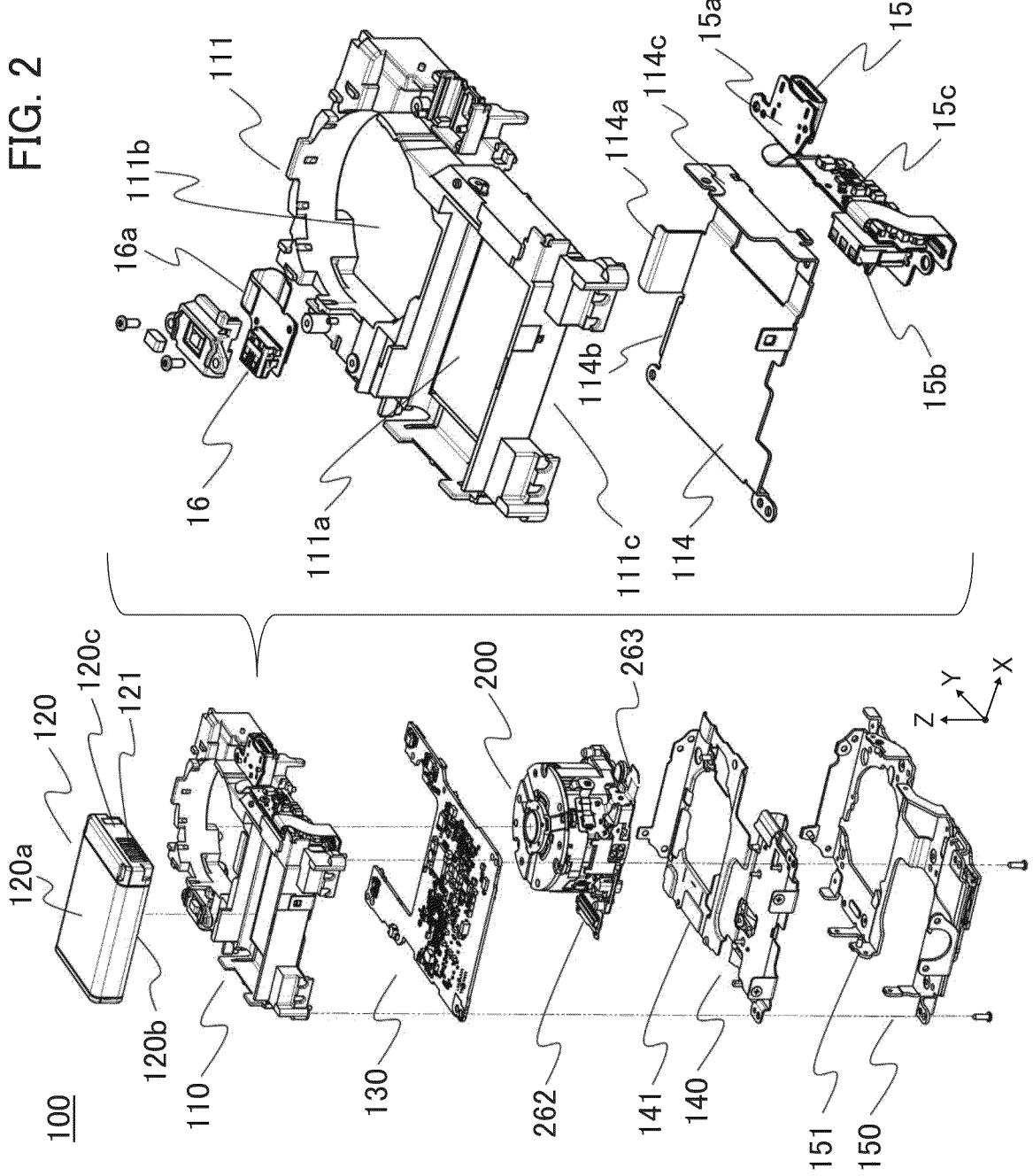
FIG. 2 is an explanatory view of a unit constituting the inside of the camera.

With reference to FIGS. 1A to 2, a constitution of a camera 1 that is an example of an optical apparatus according to the present embodiment will be described. The camera 1 is an image capturing device including a lens barrel 200. The camera 1 can capture video images and still images. First, an external constitution of the camera will be described using FIG. 1. FIGS. 1A to 1C are explanatory views of external appearances of the camera. FIG. 1A is a perspective view of a front surface main body of the camera 1. FIG. 1B is a perspective view of a rear surface main body of the camera 1. FIG. 1C is a bottom view of the camera 1.

A Z axis is parallel to an optical axis of the lens barrel 200 which is an image capturing optical axis of the camera 1, and a direction toward a subject (not shown) from the camera 1 will be regarded as a positive direction. A Y axis is an axis parallel to a vertical direction when the Z axis is parallel to a horizontal direction, and a direction toward the sky will be regarded as the positive direction. An X axis is an axis orthogonal to the Y axis and the Z axis. As shown in FIG. 1A, the X axis corresponds to a lateral direction of the camera 1, and the Y axis corresponds to an upward/downward direction of the camera 1. In addition, in the following description, a side in the positive direction of the Z axis will be regarded as "a frontal surface side", and a side in a negative direction of the Z axis will be regarded as "a rear surface side". Further, a surface of the camera 1 on the frontal surface side will be regarded as "a front surface", a surface thereof on the rear surface side will be regarded as "a rear surface", a surface thereof on a side in the positive direction of the Y axis will be regarded as "an upper surface", a surface thereof on a side in the negative direction of the Y axis will be regarded as "a bottom surface", and two surfaces substantially orthogonal to the X axis will be regarded as "side surfaces".

A front surface cover 2 forms an external appearance of the camera 1 on the front surface. The front surface cover 2 is provided with a front surface ring 3 projecting one step in the positive direction of the Z axis from the front surface cover 2 on the outer periphery of the lens barrel 200. The front surface ring 3 is provided with a protective glass 4. The protective glass 4 is a protective member curbing adhesion of dirt, occurrence of scratches, and intrusion of dust with respect to a lens positioned on the side closest to an object among lenses provided in the lens barrel 200.

Moreover, the side below the front surface ring 3 (the side in the negative direction of the Y axis) is provided with a front surface grip region 5 for a user gripping the camera 1. Since the front surface ring 3 protrudes from the front surface grip region 5, when a user grips the camera 1, it becomes easier for the user to spontaneously grip it with the front surface grip region 5 on the side below the front surface ring 3. Namely, the front surface ring 3 serves as a marker when a user grips the camera 1, which can make the hand of the user gripping the camera 1 being less likely to enter an image capturing field angle.

A start/stop button 6 and a front surface finger placement space 7 are provided within the front surface grip region 5. The start/stop button 6 is an operational member which is disposed on the upper side in the front surface grip region 5 (the side in the positive direction of the Y axis) and controls image-capturing. If the start/stop button 6 is operated by a user pressing it once, the camera 1 starts to capture images, and if it is operated by being pressed again during image-capturing, the image-capturing ends. The side below the start/stop button 6 in the front surface grip region 5 is provided with the front surface finger placement space 7 where the fingers are placed when a user grips the camera 1.

An upper surface cover 19 forms an external appearance of the camera 1 on the upper surface. The upper surface cover 19 is provided with microphone holes 20 which are disposed on the left and right sides on side above the lens barrel 200, and speaker holes 21. The microphone holes 20 are holes serving as microphones and are respectively provided near both ends on the upper surface. That is, the microphone holes 20 are provided on the side above the lens barrel 200. Since the microphone holes 20 are provided on the upper surface of the camera 1, it is possible to reduce the difference in performance of sound collection when capturing sound from the front surface side and the rear surface side of the camera 1. A plurality of speaker holes 21 are holes serving as speakers for reproducing operational sound or audio of captured video images and are provided near the center on the upper surface. The speaker holes 21 may be a single hole.

A rear surface cover 8 forms an external appearance of the camera 1 on the rear surface. The rear surface cover 8 is provided with a display unit 9 and a rear surface operational member 10. The display unit 9 displays an image, a setting, or the like in response to an instruction from a processor of the camera 1. For example, in the display unit 9, when a power source of the camera 1 is in an on-state and a still image mode or a video image mode is set, an image signal (through image) of a subject image captured by an image capturing element (not shown) is displayed. In addition, the display unit 9 is connected to a camera main body by a display unit hinge (not shown), and the display unit hinge has a rotation axis in an X direction with respect to the camera 1 and allows an opening/closing operation of approximately 180° about the rotation axis. Accordingly, a user can capture images while checking the composition in the display unit 9 when taking a self-portrait of himself/herself, capturing images of himself/herself. The display unit 9 may be a vari-angle monitor. In addition, the display unit 9 may be a touch panel which also functions as an operation unit. By associating input coordinates and display coordinates in the touch panel with each other, it is possible to constitute a GUI as if a user could directly operate a screen displayed in the touch panel.

The side below the display unit 9 is provided with a rear surface grip region 11 for a user gripping the camera 1 at a position recessed one step in a Z direction from the display unit 9. Since the display unit 9 protrudes with respect to the rear surface grip region 11, when a user grips the camera 1, it becomes easier for the user to spontaneously grip it with the rear surface grip region 11 on the side below the display unit 9. Namely, the step between the display unit 9 and the rear surface grip region 11 serves as a marker when a user grips the camera 1, which can make the hand of the user gripping the camera 1 being less likely to overlap the display unit 9.

The rear surface operational member 10 and a rear surface finger placement space 14 are provided within the rear surface grip region 11. The rear surface operational member 10 includes a plurality of operational members such as a power source button 12, a reproduction button 13, and the like. The power source button 12 is a button for switching ON/OFF of the power source of the camera 1. The reproduction button 13 is a button for instructing reproduction of recorded captured images. When a user operates the reproduction button 13, a captured image is displayed in the display unit 9. For example, the rear surface operational member 10 is provided on the lower side in the rear surface grip region 11. The rear surface finger placement space 14 is a space where the thumb of a user is placed when the user grips the camera 1. For example, the rear surface finger placement space 14 is provided on the upper side in the rear surface grip region 11 between the rear surface operational member 10 and the display unit 9. By providing the rear surface finger placement space 14 on the rear surface side of the start/stop button 6 and providing the front surface finger placement space 7 on the front surface side of the rear surface operational member 10, a user can stably grip the camera 1 and reliably perform an operation of the operational member.

A plurality of jacks and a stands 18 are provided on a side surface of the camera 1. The front surface cover 2 and the rear surface cover 8 form external appearances of the camera 1 on the side surfaces. The jacks such as a USB terminal 15, an HDMI terminal 16, and a microphone input terminal 17 are disposed at positions aligned in the Z direction between the front surface cover 2 and the rear surface cover 8 on the side surfaces of the camera 1. For example, the USB terminal 15 is provided on the side surface on the side in the positive direction of the X axis, and the HDMI terminal 16 and the microphone input terminal 17 are provided on the side surface on the side in the negative direction of the X axis. The USB terminal 15, the HDMI terminal 16, and the microphone input terminal 17 are disposed on the side above the front surface grip region 5 and the rear surface grip region 11. Due to this disposition, in a state in which cables are inserted into the jacks, it is possible to avoid a situation in which the cables become a hindrance to the hand of a user gripping the camera 1 so that usability for the user can be improved.

The side surfaces of the front surface grip region 5 and the rear surface grip region 11 are provided with the stands 18. The stands 18 are connected to the main body of the camera 1 through stand hinges, and the stand hinges each have the X axis as a rotation axis and can be rotatively operated about the rotation axis. By using the stands 18, the camera 1 can be tilted about the X axis, which allows stationary image capturing at various angles. In addition, since the stands 18 have substantially the same shapes as the shapes of the side surfaces of the front surface cover 2 and the rear surface cover 8 in a state of being stored in the camera 1, there is no disharmony in appearance and the shapes do not become a hindrance to a grip in a usage state gripped by a user.

The bottom surface of the camera 1 is provided with a tripod attachment portion 22, a strap attachment portion 23, and a media cover 24. The tripod attachment portion 22 is a female thread for attaching accessories such as a tripod. The strap attachment portion 23 is an attachment member through which a strap string or the like passes. The media cover 24 is a cover of a media unit for loading a recording medium (external memory). The media cover 24 is attached such that it can be opened and closed with respect to the main body of the camera 1.

Next, a constitution of the inside of the camera will be described using FIG. 2. FIG. 2 is an explanatory view of an internal structure of the camera. The camera 1 has an internal structure unit 100. In a main base unit 110, the lens barrel 200, a battery 120, a main substrate 130, a rear surface heat sink unit 140, and a main chassis unit 150 are assembled.

The main base unit 110 includes a main base 111, an intermediate heat sink 114, the HDMI terminal 16, a USB flexible joint 15*a*. The main base 111 is a component serving as a foundation of the main base unit 110. For example, the main base 111 is molded using a resin material. In the main base 111, a battery chamber 111*a* and a barrel chamber 111*b* are formed.

The barrel chamber 111*b* is a space for storing and holding the lens barrel 200. On the outer periphery of the barrel chamber 111*b*, the HDMI terminal 16 for external display equipment displaying images, and the USB terminal 15 for connection to external equipment for data transfer or power supply are disposed. For example, the HDMI terminal 16 is disposed toward the barrel chamber 111*b* in the negative direction of the X axis, and the USB terminal 15 is disposed toward the barrel chamber 111*b* in the positive direction of the X axis. An HDMI terminal 112 is mounted in an HDMI flexible joint 112*a* and is connected to the main substrate 130.

The battery chamber 111*a* is a space for storing and holding the battery 120. The battery chamber 111*a* is provided in a region inside the camera 1 corresponding to the front surface grip region 5. In addition, in the battery chamber 111*a*, a cutout shape (not shown) is formed on a surface facing a second surface 120*b* of the battery 120 in a thickness direction, and the intermediate heat sink 114 is disposed in a manner of covering it.

Here, the battery 120 will be described. The battery 120 has a shape close to a rectangular parallelepiped, has a surface with the largest area, and has a first surface 120*a* and the second surface 120*b* parallel to an XY plane. A third surface 120*c* orthogonal to the first surface 120*a* and the second surface 120*b* is disposed in the camera 1 in a manner of being orthogonal to the X direction. The third surface 120*c* is provided with a contact portion 121 connected to a battery terminal. In the main base 111, a battery terminal space (not shown) for storing and holding a battery terminal 15*b* is provided at a position facing the third surface 120*c* of the battery 120.

The intermediate heat sink 114 is a member for dissipating heat of the main substrate 130 and the like. The intermediate heat sink 114 has a first extension portion 114*a* and a second extension portion 114*b* which are formed by being bent to extend in the optical axis direction between the battery chamber 111*a* and the barrel chamber 111*b*. The first extension portion 114*a* extends to the front surface cover 2 side in the Z direction and is constituted to be able to transmit heat with respect to a front surface heat sink (not shown). In addition, the second extension portion 114*b* extends to the rear surface cover 8 side in the Z direction and is constituted to be able to transmit heat with respect to the main substrate 130. Namely, heat of the main substrate 130 is transmitted from the second extension portion 114*b* to the intermediate heat sink 114 and is diffused between the main substrate 130 and the battery 120. Moreover, the intermediate heat sink 114 is constituted to be able to transmit heat from the first extension portion 114*a* to the front surface heat sink. For example, the intermediate heat sink 114 is molded using a sheet metal member. Since the rigidity of a sheet metal member can be secured even when the wall thickness thereof is smaller than that of a resin member, it is possible to reduce the size of the battery chamber in the thickness direction while the shape for regulating the position of the battery is secured. In addition, a third extension portion 114*c*, which is parallel to the third surface 120*c* of the battery and is disposed toward the battery chamber 111*a* in the positive direction of the X axis, is formed in the intermediate heat sink 114.

Here, the USB flexible joint 15*a* will be described. The USB flexible joint 15*a* is provided with the USB terminal 15, the battery terminal 15*b*, and a power source circuit region 15*c*. The USB terminal 15 is connected to the main substrate 130. The battery terminal 15*b* is electrically connected to the battery 120 through the contact portion 121. In the power source circuit region 15*c*, elements related to a power source circuit such as a charging IC are mounted. The power source circuit region 15*c* is fixed such that it is grounded to the third extension portion 114*c* of the intermediate heat sink 114 and is constituted to be able to diffuse heat generated in the power source circuit to the intermediate heat sink 114.

A tripod chamber 111*c* for storing the tripod attachment portion 22 is formed toward the battery chamber 111*a* of the main base 111 in the negative direction of the Y axis. Further, screw seats (not shown) for screw-fixing the main substrate 130, a rear surface heat sink 141, and a main chassis 151 are formed on both sides of the tripod chamber 111*c* in the X axis.

The main substrate 130 includes a terminal for electrically connecting a CPU (central processing unit) or each of flexible boards. The main substrate 130 is fixed to the main base 111. The main substrate 130 is disposed in a manner of being orthogonal to the optical axis direction (Z axis direction). The main substrate 130 is formed to have a U-shape with a recessed space in which the lens barrel 200 is disposed when viewed in the optical axis direction.

The lens barrel 200 is a barrel including an image capturing optical system. The image capturing optical system forms optical images of a subject in the image capturing element. Inside the lens barrel 200, a plurality of lenses constituting the image capturing optical system, an aperture mechanism for adjusting the amount of light passing through the image capturing optical system, a focus mechanism for performing focal adjustment, and the like are mounted. For example, the lens barrel 200 is a fixed-type single focus lens. Namely, the lens barrel 200 is constituted not to be drawn out even if the power source is switched to an on-state (usage state) by a user. In addition, the lens barrel 200 of the present embodiment includes the image capturing element (not shown) generating image data by photoelectrically converting an optical image of a subject formed through the image capturing optical system. For example, the image capturing element is a sensor such as a CMOS or a CCD performing photoelectric conversion and outputs an output signal corresponding to an optical image. In addition, the lens barrel 200 has a sensor flexible printed circuit (FPC) 262 and a barrel FPC 263. The sensor FPC 262 connects the image capturing element and the main substrate 130 such that they can communicate with each other. The barrel FPC 263 connects the lens barrel 200 and the main substrate 130 such that they can communicate with each other.

The rear surface heat sink unit 140 has the rear surface heat sink 141, a wireless communication board (not shown), and a wireless FPC (not shown). The rear surface heat sink 141 diffuses heat generated from the image capturing element (not shown) and the main substrate 130 to the entire rear surface of the camera 1. The rear surface heat sink 141 is disposed on the rear surface side from the lens barrel 200 and the main substrate 130 and on the frontal surface side from the main chassis 151. For example, the rear surface heat sink 141 is manufactured by pressing a metal plate having a high thermal conductivity and a high strength (aluminum, copper, or the like). The wireless communication board (not shown) has a function of wireless communication with the outside. In addition, the wireless FPC (not shown) connects the wireless communication board and the main substrate 130 such that they can communicate with each other.

The main chassis unit 150 has the main chassis 151 and a rear surface operation board (not shown). The main chassis unit 150 is disposed on the rearmost surface side of the camera 1 in the internal structure unit 100. The main chassis 151 is a structure frame of the entire camera 1 and serves as a main ground (GND). For example, the main chassis 151 is manufactured by pressing a metal plate. A switch of the rear surface operational member 10 is mounted in the rear surface operation board (not shown).

Assembly of the internal structure unit 100 will be described. In the lens barrel 200, the main substrate 130 is embedded on the rear surface side of the main base 111 and is then embedded in the barrel chamber 111b of the main base 111, and the sensor FPC 262 and the barrel FPC 263 are connected to a terminal of the main substrate 130. Thereafter, the rear surface heat sink unit 140 and the main chassis unit 150 are embedded. At this time, they are screw-fixed to a screw seat (not shown) provided in the main base 111 with the main substrate 130 sandwiched therebetween and are further screw-fixed to the main base 111 around the barrel chamber 111b at a plurality of spots. In the present embodiment, the lens barrel 200 is clamped by the main base 111 (first holding member) with elastic members therebetween and the main chassis 151 (second holding member) positioned on a side opposite to the main base 111 in the optical axis direction with the lens barrel 200 sandwiched therebetween. Accordingly, it has a constitution in which vibration due to an actuator and the like inside the lens barrel 200 is less likely to affect the microphones (not shown) disposed inside the camera 1. That is, the camera 1 of the present embodiment has a structure for clamping the lens barrel 200.

Figure 3A:
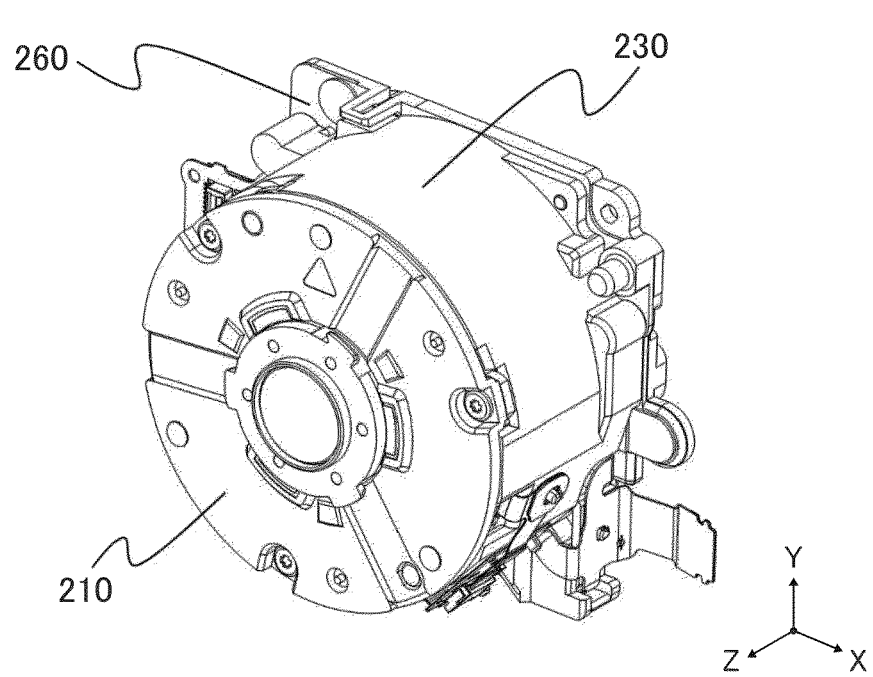
FIGS. 3A and 3B are explanatory views of a constitution of a lens barrel.
Figure 3B:
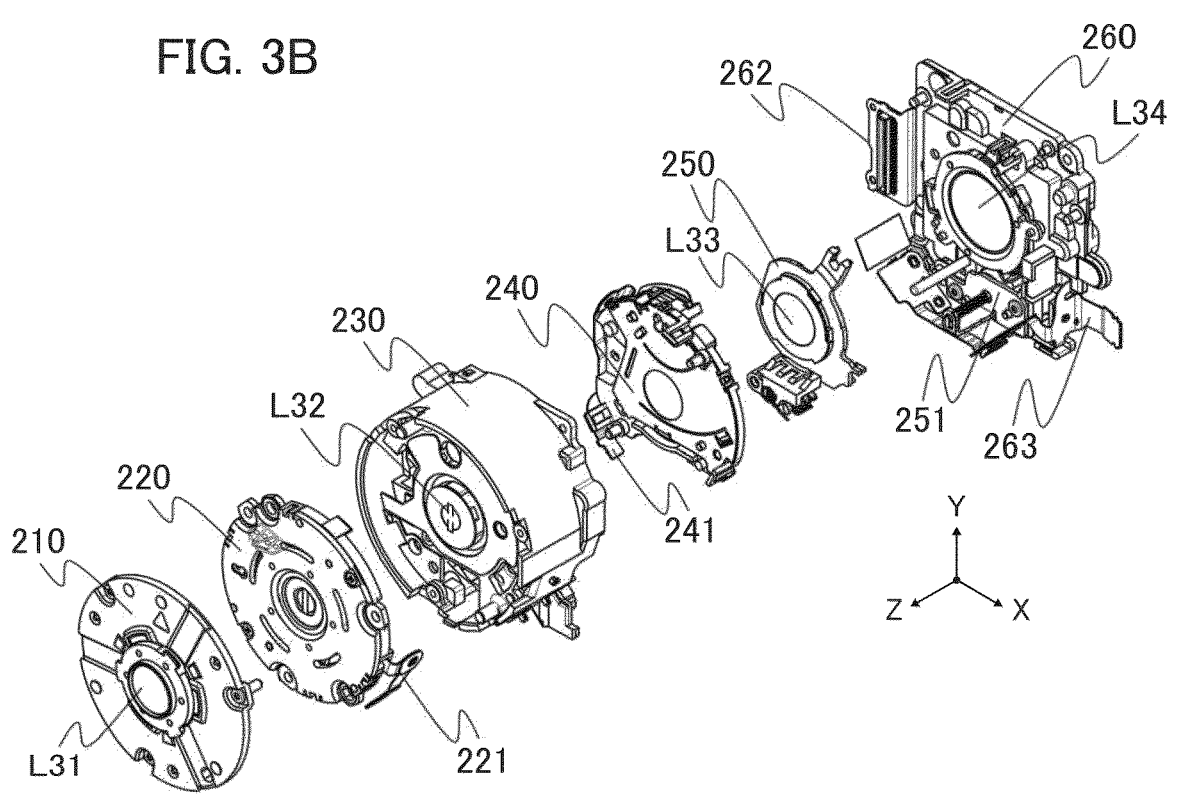

Next, with reference to FIGS. 3A and 3B, an internal constitution of the lens barrel 200 will be described. FIGS. 3A and 3B are explanatory views of a constitution of the lens barrel. FIG. 3A is a perspective view of the front surface of the lens barrel 200. FIG. 3B is an exploded perspective view of the lens barrel 200. The lens barrel 200 includes a first group barrel 210, an aperture unit 220, a second group barrel 230, an ND unit 240, a third group barrel 250, and a sensor holder 260 in this order from the frontal surface side of the camera 1. In addition, the lens barrel 200 includes the sensor FPC 262 and the barrel FPC 263 connected to the sensor holder 260.

The first group barrel 210 holds a first group lens L31. The first group barrel 210 is provided on the frontal surface side of the camera 1. The image capturing element side of the first group barrel 210 (the rear surface side of the camera 1) is provided with the aperture unit 220. The aperture unit 220 is a light amount adjustment unit adjusting the amount of light which is incident on the first group lens L31 and guided to the image capturing element. The aperture unit 220 is a member realizing an aperture mechanism. The aperture unit 220 is provided with an aperture FPC 221. The aperture FPC 221 is connected to the barrel FPC 263. The image capturing element side of the aperture unit 220 is provided with the second group barrel 230.

The second group barrel 230 holds a second group lens L32. The ND unit 240 is attached to the image capturing element side of the second group barrel 230. The ND unit 240 includes an ND filter (not shown). The ND unit 240 performs opening/closing operation of the ND filter by means of a drive force of an ND drive unit (not shown) and adjusts the amount of light which is incident on the second group lens L32 and guided to the image capturing element (not shown). In addition, the ND unit 240 is provided with an ND FPC 241. The ND unit 240 is connected to the barrel FPC 263. The image capturing element side of the ND unit 240 is provided with the third group barrel 250.

The third group barrel 250 holds a third group lens L33 constituting a focus lens. The third group barrel 250 is driven by a focus drive unit 251. The camera 1 performs focusing operation by moving the position of the third group lens L33 in the optical axis direction by means of a drive force of the focus drive unit 251. The image capturing element side of the third group barrel 250 is provided with the sensor holder 260. The sensor holder 260 holds a fourth group lens L34 on a subject side and holds the image capturing element (not shown) on the rear surface side of the camera 1. The sensor holder 260 is joined to the second group barrel 230 in the optical axis direction. In addition, the sensor holder 260 is provided with the sensor FPC 262 and the barrel FPC 263. The image capturing element and the main substrate 130 are connected to the sensor FPC 262. In the barrel FPC 263, the aperture FPC 221 and the ND FPC 241 are connected to the terminals on the outer peripheral side of the sensor holder 260.

Figures 4A, 4B, 4C, 4D:
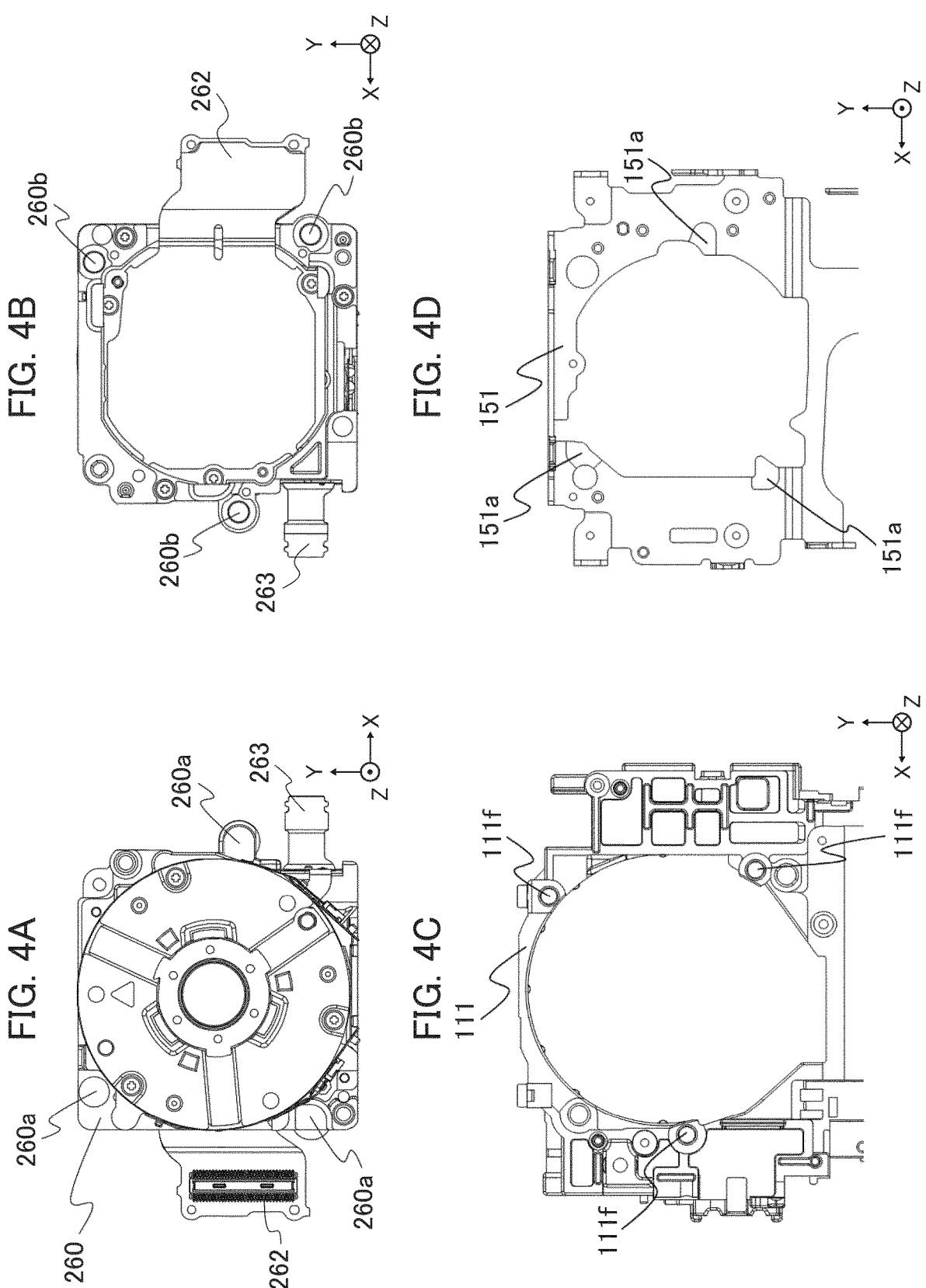
FIGS. 4A to 4D are explanatory views of a structure for clamping the lens barrel.

Next, with reference to FIGS. 4A to 6B, the structure for clamping the lens barrel 200 will be described. FIGS. 4A to 4D are explanatory views of a structure related to a structure for clamping the lens barrel. FIG. 4A is a front view of the lens barrel 200. FIG. 4B is a rear view of the lens barrel 200. FIG. 4C is a rear view of the main base 111. FIG. 4D is a front view of the main chassis 151.

The lens barrel 200 is clamped by the main base 111 and the main chassis 151 respectively with a plurality of elastic members therebetween. For example, each of the elastic members is sandwiched by a recessed accommodation portion and a flat abutment portion. The accommodation portions are provided on the frontal surface side of the elastic members which is a side assembled first, and the abutment portions are provided on the rear surface side of the elastic members which is a side assembled later. The lens barrel 200 is clamped by sandwiching the elastic members between the accommodation portions provided in the main base 111 and the abutment portions provided in the lens barrel 200 and sandwiching the elastic members between the accommodation portions provided in the lens barrel 200 and the abutment portions provided in the main chassis 151. In the present embodiment, an example in which the lens barrel 200 is clamped by the main base 111 and the main chassis 151 respectively with three elastic members therebetween will be described.

As shown in FIG. 4A, the sensor holder 260 of the lens barrel 200 includes three abutment surfaces 260a for receiving first elastic members 160a. In addition, as shown in FIG. 4B, the sensor holder 260 includes three accommodation portions 260b for accommodating second elastic members 160b. The abutment surfaces 260a are provided on the frontal surface side of the sensor holder 260, and the accommodation portions 260b are provided on the rear surface side of the sensor holder 260. For example, in FIG. 4A in which the sensor holder 260 is viewed from the frontal surface side, the three abutment surfaces 260a are respectively provided on the upper left side and the lower left side and in the vicinity of the center on the right side in the sensor holder 260. For example, in FIG. 4B in which the sensor holder 260 is viewed from the rear surface side, the three accommodation portions 260b are respectively provided on the upper right side and the lower right side and in the vicinity of the center on the left side in the sensor holder 260.

As shown in FIG. 4C, the main base 111 of the main base unit 110 includes three accommodation portions 111f for accommodating the first elastic members 160a. For example, in FIG. 4C in which the main base unit 110 is viewed from the rear surface side, the three accommodation portions 111f are respectively provided on the upper right side and the lower right side and in the vicinity of the center on the left side in the main base unit 110. That is, each of the accommodation portions 111f of the main base unit 110 is provided at a position where it is symmetrical with the abutment surfaces 260a of the sensor holder 260 with the first elastic members 160a therebetween.

As shown in FIG. 4D, the main chassis 151 includes three abutment surfaces 151a for receiving the second elastic members 160b. For example, in FIG. 4D in which the main chassis 151 is viewed from the frontal surface side, the three abutment surfaces 151a are respectively provided on the upper left side and the lower left side and around the center on the right side in the sensor holder 260. That is, each of the abutment surfaces 151a of the main chassis 151 is provided at a position where it is symmetrical with the accommodation portions 260b of the sensor holder 260 with the second elastic members 160b therebetween.

In the present embodiment, the shapes of the elastic members 160 (the elastic members 160a and the elastic members 160b) are substantially spherical shapes such as spheres, for example. Since the elastic members 160 have substantially spherical shapes, it is possible to perform assembly without being bothered by a direction of disposing the elastic members 160 when they are embedded, and thus assemblability can be improved. For example, the elastic members are manufactured by molding rubber such as NBR or IIR. The shapes and the materials of the elastic members 160 need only be able to clamp and hold the lens barrel 200 without falling down against the main base 111 side and the main chassis 151 side. For example, the shapes of the elastic members may be polyhedral shapes, columnar shapes, elliptical shapes, or the like.

Figure 5:
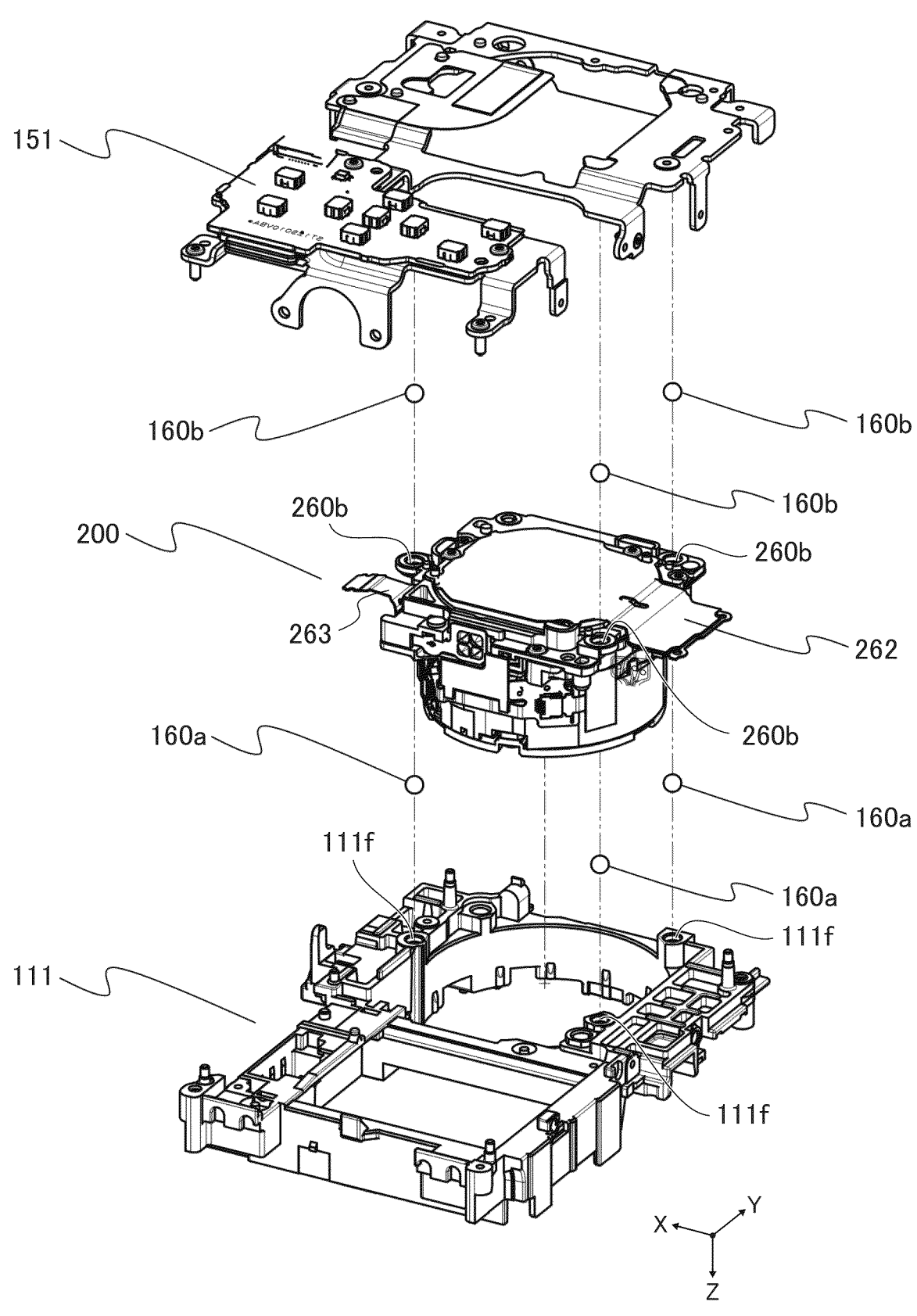
FIG. 5 is an explanatory view of the structure for clamping the lens barrel.

With reference to FIG. 5, the clamping structure for clamping the lens barrel 200 by the main base 111 and the main chassis 151 with the elastic members therebetween will be described together with a sequence of assembly. FIG. 5 is an explanatory view of the structure for clamping the lens barrel. The description will focus on components related to the structure for clamping the lens barrel 200. First, after the main substrate 130 is embedded in the main base 111, the first elastic members 160a are respectively embedded in the three accommodation portions 111f of the main base 111, and the lens barrel 200 is embedded in the barrel chamber 111b of the main base 111. Accordingly, three first elastic members 160a have shapes respectively sandwiched between the three accommodation portions 111f of the main base 111 and the three abutment surfaces 260a of the lens barrel 200. The first elastic members 160a are pressurized in the optical axis direction between the main base 111 and the lens barrel 200.

Thereafter, the second elastic members 160b are respectively embedded in the three accommodation portions 260b of the sensor holder 260, and then the rear surface heat sink unit 140 and the main chassis unit 150 are embedded. Accordingly, three second elastic members 160b have shapes respectively sandwiched between the three accommodation portions 260b of the sensor holder 260 and the three abutment surfaces 151a of the main chassis 151. The second elastic members 160b are pressurized in the optical axis direction between the sensor holder 260 of the lens barrel 200 and the main chassis 151. Further, they are screw-fixed to a screw seat (not shown) provided in the main base 111 with the main substrate 130 sandwiched therebetween and are further screw-fixed to the main base 111 around the barrel chamber 111b at a plurality of spots.

In assembling the main base 111 to the main chassis 151, the main base 111 becomes a reference component for assembly, and other components are sequentially embedded in the positive direction of the Z axis. The main base 111 is embedded by dropping it into an assembly jig (not shown) such that it abuts the frontal surface, and then the first elastic members 160a, the lens barrel 200, the second elastic members 160b, and finally the main chassis 151 are sequentially embedded in an overlapping form.

Since the elastic members 160a and the elastic members 160b are respectively embedded in the accommodation portions 111f provided in the main base 111 and the accommodation portions 260b provided in the lens barrel 200, it is desirable that the accommodation portions 111f and the accommodation portions 260b have recessed shapes. With the accommodation portions 111f and the accommodation portions 260b having recessed shapes and the elastic members 160 having substantially spherical shapes, disposition of the elastic members 160 is completed by simply dropping the elastic members 160 into the respective recessed shapes of the accommodation portions. In addition, since the elastic members 160 have substantially spherical shapes, it is possible to perform assembly without being bothered by directivity of the elastic members 160 when they are embedded. In this manner, assemblability can be improved with each of the accommodation portions having recessed shapes, in which the elastic members 160 are embedded, and the elastic members 160 having substantially spherical shapes.

In the present embodiment, each of the abutment surfaces 260a of the lens barrel 200 facing the accommodation portions 111f of the main base 111 and the abutment surfaces 151a of the main chassis 151 facing the accommodation portions 260b of the lens barrel 200 is a flat surface, but the embodiment is not limited to this. For example, the shapes of the abutment surfaces 260a and the abutment surfaces 151a may be recessed shapes. In addition, it is desirable that all the recessed shapes of the three accommodation portions 111f of the main base 111 and the three accommodation portions 260b of the sensor holder 260 be the same shapes, but the embodiment is not limited to this.

The lens barrel 200 is clamped and held by the main base 111 and the main chassis 151 with the plurality of elastic members 160 therebetween. For this reason, if there is a difference between elastic forces of the elastic members 160 disposed at six spots in total in the front and the rear with respect to the lens barrel 200, there is a probability that the lens barrel 200 will fall down with respect to the main base 111 or the main chassis 151. If the lens barrel 200 tilts due to the difference in elastic forces, there is concern that the lens barrel 200 may become eccentric with respect to the front surface cover 2 resulting in poor external appearance, the lens barrel 200 may interfere with other components inside the camera, the optical performance of the lens barrel 200 may deteriorate, or the like. Therefore, it is desirable that the elastic forces of the elastic members 160 (six in total) disposed in the three accommodation portions 111*f* and the three accommodation portions 260*b* on the main base 111 side and the main chassis 151 side with respect to the lens barrel 200 be equivalent to each other. In order to make the elastic forces of the elastic members 160 equivalent to each other, it is desirable that the shapes of the elastic members 160 (six in total) respectively disposed in the accommodation portions 111*f* and the accommodation portions 260*b* be the same shapes and the materials thereof also be the same. In addition, it is desirable that the three accommodation portions 111*f* of the main base 111 and the three accommodation portions 260*b* of the sensor holder 260 have the same shapes.

Further, it is desirable that the positions of the three accommodation portions 111*f* of the main base 111 and the three accommodation portions 260*b* of the sensor holder 260 in an XY plane be the same. If the centroidal position of the three accommodation portions 111*f* of the main base 111 in an XY plane and the centroidal position of the three accommodation portions 260*b* of the sensor holder 260 in an XY plane are the same, the positions of the accommodation portions 111*f* and the accommodation portions 260*b* in an XY plane may not be the same.

In addition, in the present embodiment, three elastic members 160 are provided on each of the main base 111 side and the main chassis 151 side with respect to the lens barrel 200, but the embodiment is not limited to this. For example, four first elastic members 160*a* may be provided on the main base 111 side, and four second elastic members 160*b* may be provided on the main chassis 151 side. Moreover, if resultant forces of the elastic forces of the first elastic members 160*a* disposed on the main base 111 side and resultant forces of the elastic forces of the second elastic members 160*b* disposed on the main chassis 151 side are equivalent to each other, there is no need for the numbers of the elastic members 160 disposed thereon to be the same. For example, three first elastic members 160*a* may be provided on the main base 111 side, and four second elastic members 160*b* may be provided on the main chassis 151 side. As described above, the lens barrel 200 need only have a constitution of being clamped and held without falling down to the main base 111 side or the main chassis 151 side, and the shapes, the numbers, and the positions of the elastic members 160 and the accommodation portions 111*f* are not limited.

After the first elastic members 160*a*, the lens barrel 200, the second elastic members 160*b*, and the main chassis 151 are embedded in the main base 111 in an overlapping form, the main chassis 151 is screw-fixed to the main base 111 around the barrel chamber 111*b* at a plurality of spots. Accordingly, the lens barrel 200 is clamped and held by the main base 111 and the main chassis 151 with the elastic members 160 therebetween.

Next, elastic forces of the elastic members 160 will be described. As the elastic forces of the elastic members 160 with respect to the lens barrel 200 become smaller, vibration occurring in the lens barrel 200 is less likely to affect the microphones (not shown) disposed inside the camera 1. On the other hand, the elastic forces of the elastic members 160 with respect to the lens barrel 200 become greater, vibration occurring in the lens barrel 200 is more likely to be propagated to the microphones (not shown) disposed inside the camera 1. For this reason, in order to reduce propagation of vibration occurring in the lens barrel 200 to the microphones (not shown) disposed inside the camera 1, it is desirable that the elastic forces of the elastic members 160 be smaller.

On the other hand, the lens barrel 200 is held by the main base 111 and the main chassis 151 only by being clamped with the elastic members 160 therebetween. For this reason, when the main body of the camera 1 receives an impact from the outside or falls, the lens barrel 200 moves against the elastic forces of the elastic members 160. Therefore, in order to make the lens barrel 200 be less likely to move against an impact or the like from the outside, it is desirable that the elastic forces of the elastic members 160 be greater. For this reason, there is a need to decide the elastic forces of the elastic members 160 by complexly taking an influence of vibration occurring in the lens barrel 200 on the microphones and an influence with respect to an impact or the like from the outside into consideration.

In order for the elastic members 160 to have appropriate elastic forces, there is a need for the elastic members 160 to be squashed with an appropriate amount of deflection (charge amount). When the main chassis 151 is screw-fixed to the main base 111 around the barrel chamber 111*b* at a plurality of spots, it is possible to manage the amount of deflection in the elastic members 160 by managing the height of the main chassis 151 using a jig (not shown). Therefore, it is required to assemble the main chassis 151 having a height realizing the amount of deflection in the elastic members 160 achieving both reduction in propagation of vibration generated in the lens barrel 200 and a resistance against an impact from the outside. In addition, in order to set appropriate elastic forces, in addition to changing the amount of deflection in the elastic members 160, the elastic forces can also be changed by changing the magnitude or the hardness.

Figure 6A:
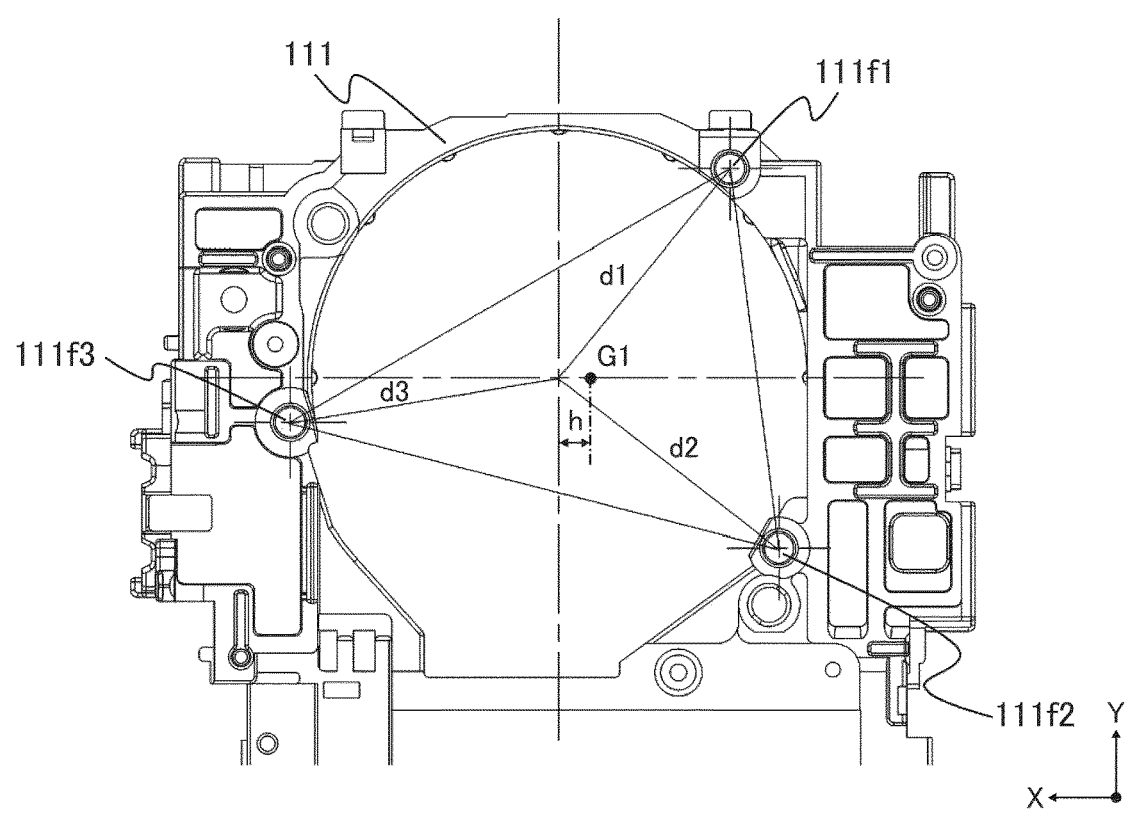
FIGS. 6A and 6B are views showing a positional relationship between a main base and an accommodation portion of a sensor holder.
Figure 6B:
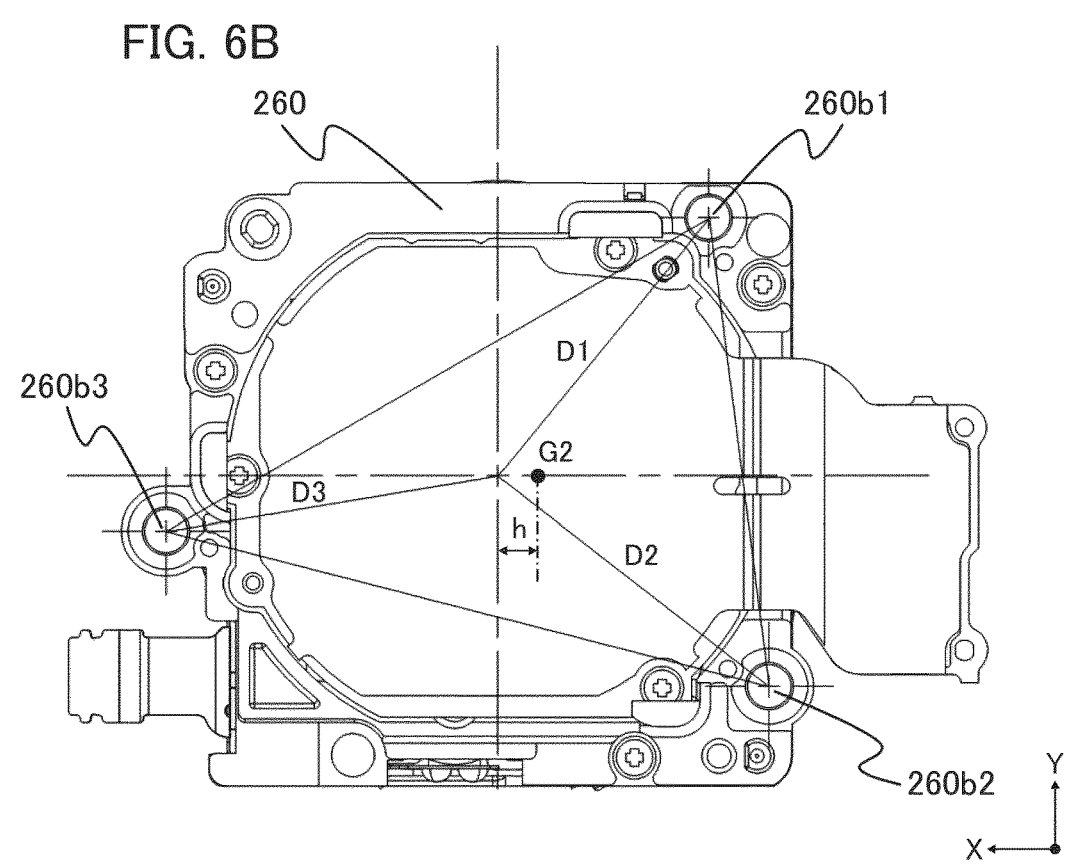

Next, with reference to FIGS. 6A and 6B, a positional relationship between the lens barrel 200, and the accommodation portions 111*f* and the accommodation portions 260*b* will be described. FIGS. 6A and 6B are cross-sectional views of a main portion showing a constitution of the structure for clamping the lens barrel 200. FIG. 6A is a rear view showing a positional relationship of the accommodation portions 111*f* of the main base 111. FIG. 6B is a rear view showing a positional relationship of the accommodation portions 260*b* of the sensor holder 260.

As shown in FIG. 6A, the elastic members 160*a* are disposed in the three accommodation portions 111*f* (111*f*1, 111*f*2, and 111*f*3) in an XY plane. Similarly, as shown in FIG. 6B, the elastic members 160*b* are disposed in the three accommodation portions 260*b* (260*b*1, 260*b*2, and 260*b*3) in an XY plane. Here, the centroidal position of the three accommodation portions 111*f* of the main base 111 will be regarded as a centroidal position G1, and the centroidal position of the three accommodation portions 260*b* of the lens barrel 200 will be regarded as a centroidal position G2. As described above, it is desirable that the positions G1 and G2 in the XY direction be the same. Further, it is desirable that the centroidal position G1 and the centroidal position G2 be aligned with the center of the optical axis.

The front surface of the camera 1 is provided with the front surface ring 3 including the protective glass 4. The protective glass 4 is a component preventing the lens L31 positioned on the foremost surface side in the lens barrel 200 from being dirty due to touch with a hand and preventing scratches and intrusion of dust. If the position of the center of the optical axis of the protective glass 4 is eccentric with the center of the optical axis of the lens barrel 200, there is concern that deterioration may occur in optical characteristics, such as occurrence of blurring or comatic aberration and decrease in amount of ambient light. Even if the lens barrel 200 tilts, in a state in which the centroidal position G1, the centroidal position G2, and the center of the optical axis of the lens barrel 200 are aligned, the position of the center of the optical axis of the protective glass 4 does not become eccentric with the center position of image capturing. However, in a state in which the centroidal position G1 and the centroidal position G2 are eccentric by h with the position of the center of the optical axis of the protective glass 4, if the lens barrel 200 tilts centering on the centroidal position G1 the centroidal position G2, the position of the center of the optical axis of the protective glass 4 becomes eccentric with the position of the center of the optical axis of the lens barrel 200. Accordingly, optical characteristics of the lens barrel 200 deteriorate. As the eccentricity h between the centroidal positions G1 and G2 and the center of the optical axis of the lens barrel 200 increases, an eccentricity $\Delta h$ of the centroidal positions G1 and G2 in the XY direction when the lens barrel 200 tilts increases. Therefore, deterioration in optical characteristics increases. On the other hand, if the centroidal positions G1 and G2 and the center of the optical axis of the lens barrel 200 are aligned, that is, if the eccentricity h of the center of the optical axis is zero, the eccentricity $\Delta h$ of the centroidal positions G1 and G2 in the XY direction becomes zero, and thus optical characteristics do not deteriorate theoretically. For this reason, it is desirable that the centroidal positions G1 and G2 and the center of the optical axis of the lens barrel 200 be substantially aligned.

Next, a positional relationship among the accommodation portions 111f of the main base 111, the accommodation portions 260b of the sensor holder 260, and the center of the optical axis of the lens barrel 200 will be described. As shown in FIG. 6A, each of the three accommodation portions 111f of the main base 111 will be regarded as an accommodation portion 111f1, an accommodation portion 111f2, and an accommodation portion 111f3. In addition, each of the distances from the accommodation portion 111f1, the accommodation portion 111f2, and the accommodation portion 111f3 to the center of the optical axis of the lens barrel 200 will be regarded as d1, d2, and d3. It is desirable that the distance relationship between the accommodation portions of the main base 111 and the center of the optical axis of the lens barrel 200 be d1=d2=d3.

As shown in FIG. 6B, each of the three accommodation portions 260b of the sensor holder 260 will be regarded as an accommodation portions 260b1, an accommodation portions 260b2, and an accommodation portions 260b3. In addition, each of the distances from the accommodation portions 260b1, the accommodation portions 260b2, and the accommodation portions 260b3 to the center of the optical axis of the lens barrel 200 will be regarded as D1, D2, and D3. It is desirable that the distance relationship between the accommodation portions of the sensor holder 260 and the center of the optical axis of the lens barrel 200 be D1=D2=D3.

Further, when the center of the optical axis of the lens barrel 200 is the rotation center, the distance from the center position of each of the accommodation portions to the position of the center of the optical axis of the lens barrel 200 is d, and the elastic forces of the elastic members 160 are F, a moment N generated by each of the accommodation portions becomes N=d×F. In order to prevent the lens barrel 200 from falling down with respect to the main base 111 and the main chassis 151, as described above, the elastic forces of the elastic members 160 of the six accommodation portions are made the same. Moreover, the moments N generated in the three accommodation portions in each of the front and the rear with the lens barrel 200 sandwiched therebetween are made balanced. If d1=d2=d3 and D1=D2=D3 are established, since all the components d in the components of the moment become the same, it is possible to reduce the difference in moment occurring in each of the accommodation portions. As a result, it is possible to reduce the tilt of the lens barrel 200. It is desirable that the positions of the three accommodation portions 111f on the main base 111 side and the accommodation portions 260b on the sensor holder 260 side in the XY direction be the same. In this manner, each of the accommodation portions is formed at a position satisfying the foregoing conditions.

Figure 7:
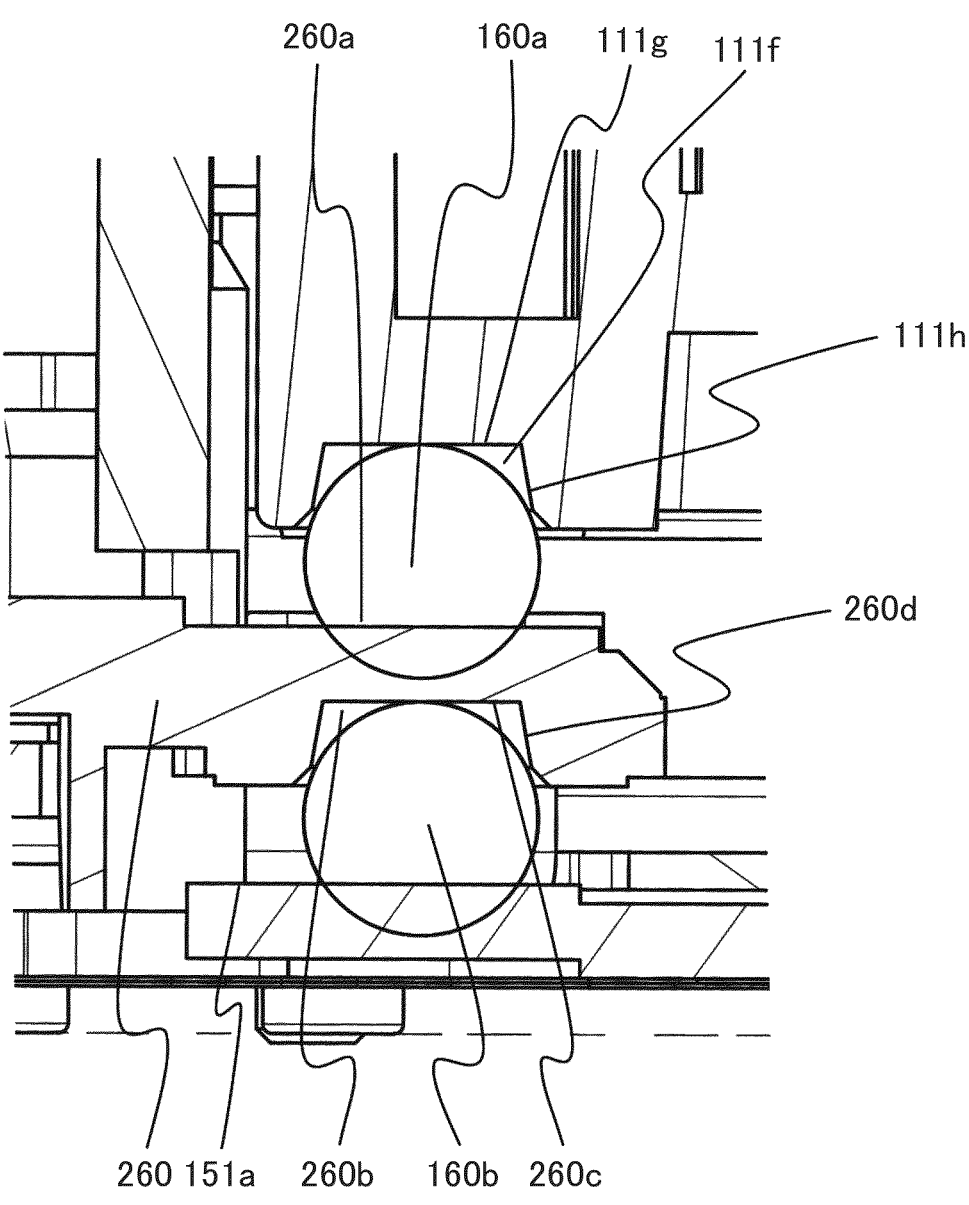
FIG. 7 is an explanatory view of a relationship between elastic members and accommodation portions.

Next, with reference to FIGS. 4A to 4D and 7, the shapes of the elastic members 160 (160a and 160b) and the accommodation portions (the accommodation portions 111f and the accommodation portions 260b) will be described. FIG. 7 is an explanatory view of a relationship between elastic members and accommodation portions. As shown in FIG. 7, the elastic members 160 have spherical shapes. In addition, the accommodation portions 111f and the accommodation portions 260b accommodating the elastic members 160 have recessed shapes. In order to prevent the lens barrel 200 from falling down with respect to the main base 111 or the main chassis 151, it is important that the elastic forces of the elastic members 160 disposed in all the accommodation portions are the same.

Each of the accommodation portions 111f having a recessed shape has a bottom surface 111g and a side wall 111h. Each of the accommodation portions 260b having a recessed shape has a bottom surface 260c and a side wall 260d. For instance, when each of the elastic members 160 is a rectangular parallelepiped, a surface of the elastic member 160 which comes into contact with the bottom surface or the abutment surface of the accommodation portion becomes any of three surfaces of the rectangular parallelepiped having different sizes. If a surface, of the elastic member 160 disposed in each of the accommodation portions, which comes into contact with the bottom surface or the abutment surface of the accommodation portion differs, a difference occurs in amount of deflection in each of the elastic members 160, and a difference occurs in elastic forces of the elastic members 160. In order to make the elastic forces of the rectangular parallelepiped elastic members 160 accommodated in all the accommodation portions the same, there is a need to assemble them while checking the directivity during assembly of the elastic members 160 so that assemblability deteriorates.

With the elastic members 160 having symmetrical spherical shapes, it is possible to assemble them without being aware of the direction of embedment (directivity) when they are embedded with respect to the accommodation portions during assembling. Accordingly, assemblability of the elastic members 160 is improved. In addition, although the elastic members 160 are held by being squashed by a predetermined amount of deflection between the accommodation portions and the abutment surfaces, since the shapes of the elastic members 160 are symmetrically spherical shapes, the deformation states of the elastic members 160 become substantially the same regardless of the direction of embedment. For this reason, it is possible to make the elastic forces of all the elastic members 160 disposed in the respective accommodation portions the same.

The shapes of the elastic members 160 are not limited to spherical shapes and may be any shape as long as they are symmetrical, all the elastic forces of the elastic members 160 are the same, and the elastic members 160 can be embedded regardless of the directivity at the time of assembly. For example, if the elastic members 160 are regular polyhedrons, no matter which surface comes into contact with the bottom surface of the accommodation portion, the shape of the surface which comes into contact with the abutment surface becomes the same so that no difference occurs in elastic force. The shapes of the elastic members 160 can also be regular polyhedral shapes.

In the foregoing description, ideal shapes for the elastic members 160 have been described from the viewpoint of assembly. Next, ideal shapes for the elastic members 160 from the viewpoint of the elastic forces of the elastic members 160 will be described. As described above, if the difference in elastic forces of the elastic members 160 disposed in the respective accommodation portions can be reduced as much as possible, it is possible to reduce deterioration in optical performance of the lens barrel 200. Moreover, it is also possible to curb poor external appearance due to the lens barrel 200 eccentric with the front surface cover 2 and interference of the lens barrel 200 with other components inside the camera. In order to make all the elastic forces of the elastic members 160 equivalent to each other, for example, it is required that the shapes of all the elastic members 160 are the same, the shapes of all the accommodation portions are the same, and the heights of the bottom surfaces of all the accommodation portions and the abutment surfaces are the same. However, they are not completely the same due to finished conditions of actual components, and a difference occurs between the elastic members 160. As a result, a difference occurs in elastic forces of the elastic members 160. Hence, in the present embodiment, in order to reduce the difference in elastic forces, the amount of change in the amount of elasticity with respect to the amount of change in the amount of deflection is reduced.

Figure 8:
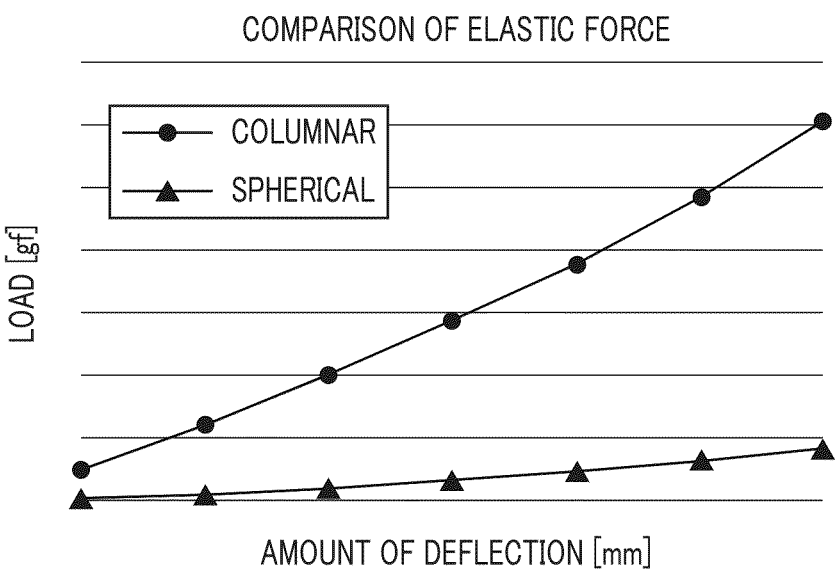
FIG. 8 is a view showing a relationship between an amount of deflection in the elastic members and an elastic force.

FIG. 8 is a view showing a relationship between an amount of deflection in the elastic members and an elastic force. In the comparison graph of elastic force shown in the FIG. 8, the vertical axis indicates load, and the horizontal axis indicates amount of deflection. The circular dots indicate a case in which the elastic members 160 have columnar shapes, and the triangular dots indicate a case in which the elastic members 160 have spherical shapes. Here, it is assumed that the recessed shapes of all the accommodation portions (the accommodation portions 111f and the accommodation portions 260b) are the same and the volumes of the elastic members 160 are the same as well.

As shown in the graph of FIG. 8, it can be seen that the gradient is smaller in the spherical shapes than in the columnar shapes and the amount of change in elastic forces with respect to the amount of change in amount of deflection in the elastic members 160 is smaller in the spherical shapes. Therefore, even if a difference occurs in amounts of deflection in six elastic members 160 due to the finished conditions of the components, it is possible to further reduce the difference in elastic forces with spherical shapes. For this reason, it is more desirable to use spherical shapes than columnar shapes in order to reduce the difference in all the elastic members 160 disposed in the respective accommodation portions. The shapes of the elastic members 160 are not limited to spherical shapes and need only be able to reduce the amount of change in elastic forces with respect to the amount of change in amount of deflection in the elastic members 160.

Next, the shapes of the accommodation portions (the accommodation portions 111f and the accommodation portions 260b) will be described. Here, the shapes thereof will be described with the accommodation portions 111f as an example, but the same applies to the accommodation portions 260b as well. The accommodation portions 111f have recessed shapes for accommodating the elastic members 160a. Regarding the shapes of the accommodation portions 111f, it is important that they have excellent assemblability and fluctuation in elastic forces due to positional fluctuation of the elastic members 160a at the time of assembly is small.

First, the shapes of the accommodation portions 111f having excellent assemblability will be described. Here, it is assumed that the elastic members 160a have a diameter of 2.5 mm. There is a need for such small elastic members 160a to be embedded in the accommodation portions 111f using tweezers or the like, which does not provide good workability. For this reason, it is required that the accommodation portions 111f accommodating the elastic members 160a have shapes in which the elastic members 160a are reliably inserted when being embedded.

Hence, in the present embodiment, the shapes of the accommodation portions 111f are truncated conical shapes tapered from the bottom surfaces 111g to entrances of the accommodation portions 111f (abutment surfaces 151a side). That is, the accommodation portions 111f have circular cross-sectional shapes in plane orthogonal to the optical axis (an XY plane). In addition, in the recessed shapes of the accommodation portions 111f, the cross-sectional areas of opening portions in a plane orthogonal to the optical axis are larger than the cross-sectional areas of the bottom surfaces 111g (bottom surface portions).

As angles θ formed by the bottom surfaces 111g and the side walls 111h of the accommodation portions 111f are increased, it is easier for them to function as guides when the elastic members 160a are input to the accommodation portions 111f, and assemblability is improved. On the other hand, as the angles θ are increased, the elastic members 160a are more likely to come off from the accommodation portions 111f due to an impact or the like. For this reason, there is a need to form the side walls 111h by setting the angles θ such that the elastic members 160a satisfy both being likely to be embedded and being unlikely to come off. For example, in the present embodiment, the angles θ formed by the bottom surfaces 111g and the side walls 111h of the accommodation portions 111f are set to 100 degrees.

Figure 9A:
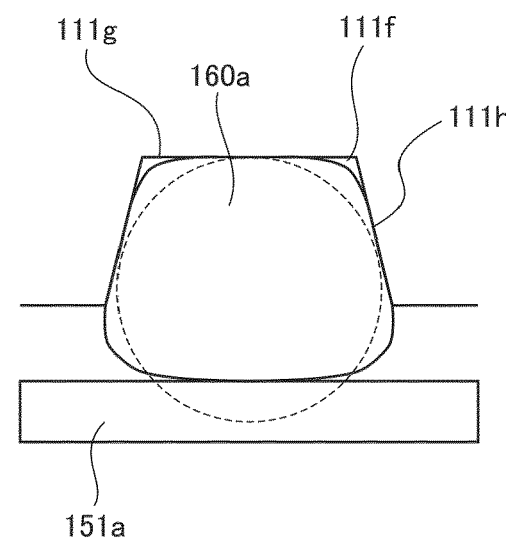
FIGS. 9A to 9C are explanatory views of a gap relationship between the elastic member and the accommodation portion and a situation of deformation in the elastic member.
Figure 9B:
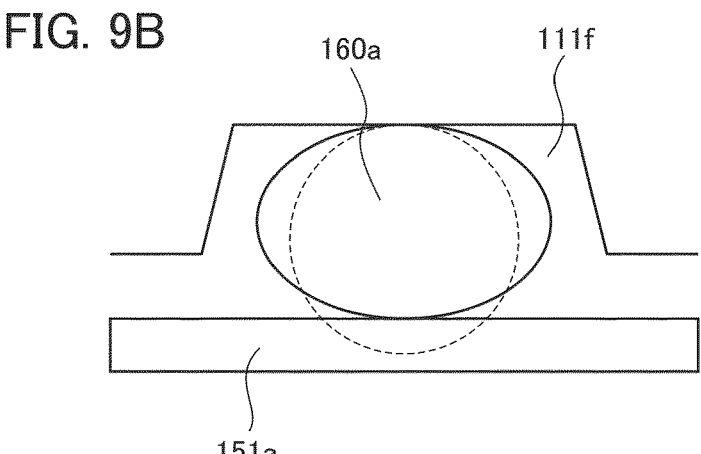
Figure 9C:
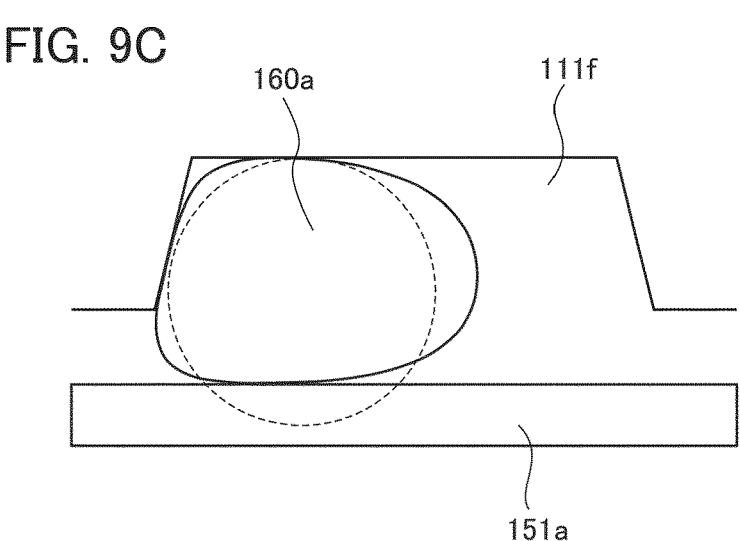

Next, the shape of the accommodation portion 111f in which fluctuation in elastic force is reduced will be described using FIGS. 9A to 9C. FIGS. 9A to 9C are explanatory views of a gap relationship between the elastic member and the accommodation portion and a situation of deformation in the elastic member. In FIGS. 9A to 9C, the elastic member 160a indicated by the dotted line shows a state when it is accommodated in the accommodation portion 111f, that is, before being squashed (before deformation), and the elastic member 160a indicated by the solid line shows a state after it is sandwiched and squashed between the accommodation portion 111*f* and the abutment surface 151*a* (after deformation).

FIG. 9A is a view showing a squashed degree of the elastic member 160*a* in a state in which the gap between the elastic member 160*a* and the accommodation portion 111*f* is appropriate. As indicated by the dotted line in FIG. 9A, when the gap between the elastic member 160*a* and the accommodation portion 111*f* before deformation is appropriate, that is, when the gap between the elastic member 160*a* and the side wall 111*h* is small, the elastic member 160*a* does not move in the accommodation portion 111*f* and the position is stable. If the elastic member 160*a* is squashed by a predetermined amount of deflection between the accommodation portion 111*f* and the abutment surface 151*a*, the elastic member 160*a* abuts the bottom surface 111*g* and the side wall 111*h* of the accommodation portion 111*f*, and the abutment surface 151*a* and is deformed into the shape indicated by the solid line in FIG. 9A. The elastic member 160*a* after deformation abuts the side wall 111*h* throughout the perimeter. Since the position of the elastic member 160*a* is stable in the space surrounded by the accommodation portion 111*f* and the abutment surface 151*a*, the squashed degree is uniform. In this manner, an elastic force of the elastic member 160*a* becomes substantially constant. Therefore, if the gap between the elastic member 160*a* and the accommodation portion 111*f* is appropriate, it is possible to reduce fluctuation in elastic force due to positional fluctuation in the elastic member 160*a* at the time of assembly.

FIGS. 9B and 9C are schematic views showing the squashed degree of the elastic member 160*a* in a state in which the gap between the elastic member 160*a* and the accommodation portion 111*f* is excessively large. In FIGS. 9B and 9C, the shape of the accommodation portion 111*f* is the same, and the position of the elastic member 160*a* differs. In the accommodation portion 111*f* shown in FIGS. 9B and 9C, compared to the accommodation portion 111*f* shown in FIG. 9A, although the angle θ formed by the bottom surface 111*g* and the side wall 111*h* is the same, the bottom surface 111*g* is larger. For this reason, the elastic member 160*a* before deformation moves in the accommodation portion 111*f* so that the position is not stable.

FIG. 9B shows a state in which the elastic member 160*a* is substantially at the center position in the accommodation portion 111*f*. As indicated by the dotted line in FIG. 9B, the elastic member 160*a* before deformation has not abutted the accommodation portion 111*f*. If the elastic member 160*a* is squashed by a predetermined amount of deflection between the accommodation portion 111*f* and the abutment surface 151*a*, the elastic member 160*a* abuts the bottom surface 111*g* of the accommodation portion 111*f* and the abutment surface 151*a* and is deformed into the shape indicated by the solid line in FIG. 9B. At this time, since there is a sufficient gap between the elastic member 160*a* and the side wall 111*h*, the elastic member 160*a* does not come into contact with the side wall 111*h*. As shown in FIG. 9B, unless the elastic member 160*a* abuts the side wall 111*h*, the squashed degree of the elastic member 160*a* is uniform.

FIG. 9C shows a state in which the elastic member 160*a* is biased to the side wall 111*h* side of the accommodation portion 111*f*. As indicated by the dotted line in FIG. 9C, a part of the elastic member 160*a* before deformation abuts the accommodation portion 111*f*. If the elastic member 160*a* is squashed by a predetermined amount of deflection between the accommodation portion 111*f* and the abutment surface 151*a*, the elastic member 160*a* abuts the side wall 111*h* in addition to the bottom surface 111*g* of the accommodation portion 111*f* and the abutment surface 151*a* and is deformed into the shape indicated by the solid line in FIG. 9C. At this time, the elastic member 160*a* is in a state in which only a part thereof abuts the side wall 111*h*. In addition, since the contact area with respect to the bottom surface 111*g*, the abutment surface 151*a*, and the side wall 111*h* differs depending on the position of the elastic member 160*a* with respect to the accommodation portion 111*f*, the squashed degree of the elastic member 160*a* is not uniform and varies. For this reason, fluctuation occurs in elastic force of the elastic member 160*a*.

As shown in FIGS. 9B and 9C, in a state in which the gap between the elastic member 160*a* and the accommodation portion 111*f* is excessively large, the position of the elastic member 160*a* is not fixed. Moreover, a difference occurs in elastic force depending on where the elastic member 160*a* is positioned in the accommodation portion 111*f*. For this reason, in a state in which the gap between the elastic member 160*a* and the accommodation portion 111*f* is excessively large, fluctuation occurs in elastic force due to positional fluctuation of the elastic member 160*a* during assembly. Therefore, in order to reduce fluctuation in elastic force of the elastic member 160*a*, there is a need to appropriately manage the gap between the elastic member 160*a* and the accommodation portion 111*f*, that is, reduce the gap between the elastic member 160*a* and the side wall 111*h* as shown in FIG. 9A. The recessed shape of the accommodation portion 111*f* is not limited to the truncated conical shape shown in FIG. 9A and need only be a shape in which fluctuation in elastic force of the elastic member 160*a* can be reduced. For example, if the cross-sectional shape of a columnar shape, a polygonal prism, a truncated polygonal pyramid shape, or the like in an XY plane is a circular shape or a polygonal shape, the squashed degree of the elastic member 160*a* becomes uniform and an elastic force becomes substantially constant by appropriately setting the gap between the elastic member 160*a* and the accommodation portion 111*f*.

In the present embodiment, an example in which the accommodation portion 111*f* is formed in the main base 111 and the accommodation portion 260*b* is formed in the sensor holder 260 of the lens barrel 200 has been described, but the embodiment is not limited to this. The accommodation portion accommodating the first elastic member 160*a* need only be formed in at least one of the sensor holder 260 of the lens barrel 200 and the main base 111. In addition, the accommodation portion accommodating the second elastic member 160*b* need only be formed in any one of the sensor holder 260 of the lens barrel 200 and the main chassis 151. At this time, each of the accommodation portions is formed such that the embedment directions of the first elastic member 160*a* and the second elastic member 160*b* become the same.

As described above, according to the constitutions of the elastic members and the accommodation portions of the present embodiment, it is possible to achieve excellent assemblability and reduce fluctuation in elastic force. Accordingly, it is possible to reduce deterioration in optical performance of the lens barrel. Moreover, it is also possible to curb poor external appearance due to the lens barrel eccentric with the front surface cover and interference of the lens barrel with other components inside the camera. Moreover, due to the structure for clamping the lens barrel of the present embodiment, it is possible to facilitate assembly and reduce propagation of vibration occurring in the lens barrel to the microphones.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-064031, filed Apr. 11, 2023, which is hereby incorporated by reference wherein in its entirety.

What is claimed is:

1. An optical apparatus comprising:

a lens barrel;

holding members sandwiching and holding the lens barrel with elastic members therebetween; and the elastic members disposed between the lens barrel and the holding members, wherein the holding members include a first holding member, and a second holding member which is disposed on a side opposite to the first holding member in an optical axis direction with the lens barrel sandwiched therebetween, the elastic members include a plurality of first elastic members disposed between the lens barrel and the first holding member, and a plurality of second elastic members disposed between the lens barrel and the second holding member, a plurality of first accommodation portions accommodating the first elastic members are formed in at least one of the lens barrel and the first holding member, a plurality of second accommodation portions accommodating the second elastic members are formed in at least one of the lens barrel and the second holding member, the first elastic members and the second elastic members have spherical shapes, and the first accommodation portions and the second accommodation portions have recessed shapes capable of accommodating the elastic members.

2. The optical apparatus according to claim 1, wherein the first elastic members and the second elastic members are disposed in the same shape and the same number.

3. The optical apparatus according to claim 1, wherein amounts of deflection in the first elastic members and the second elastic members are equivalent to each other.

4. The optical apparatus according to claim 1, wherein the first accommodation portions and the second accommodation portions are provided in the same shape and the same number.

5. The optical apparatus according to claim 1, wherein the first accommodation portions and the second accommodation portions are formed in one of the lens barrel and the holding members assembled first.

6. The optical apparatus according to claim 1, wherein cross-sectional shapes of the first accommodation portions and the second accommodation portions in a plane orthogonal to an optical axis are circular shapes or polygonal shapes.

7. The optical apparatus according to claim 1, wherein in the recessed shapes of the first accommodation portions and the second accommodation portions, a cross-sectional area of an opening portion is larger than a cross-sectional area of a bottom surface portion in a plane orthogonal to an optical axis.

8. An optical apparatus comprising:

a lens barrel;

holding members sandwiching and holding the lens barrel with elastic members therebetween; and the elastic members disposed between the lens barrel and the holding members, wherein the holding members include a first holding member, and a second holding member which is disposed on a side opposite to the first holding member in an optical axis direction with the lens barrel sandwiched therebetween, the elastic members include a plurality of first elastic members disposed between the lens barrel and the first holding member, and a plurality of second elastic members disposed between the lens barrel and the second holding member, a plurality of first accommodation portions accommodating the first elastic members are formed in at least one of the lens barrel and the first holding member, a plurality of second accommodation portions accommodating the second elastic members are formed in at least one of the lens barrel and the second holding member, the first elastic members and the second elastic members have regular polyhedron shapes, and the first accommodation portions and the second accommodation portions have recessed shapes capable of accommodating the elastic members.

* * * * *